UNITED STATES PATENT OFFICE.

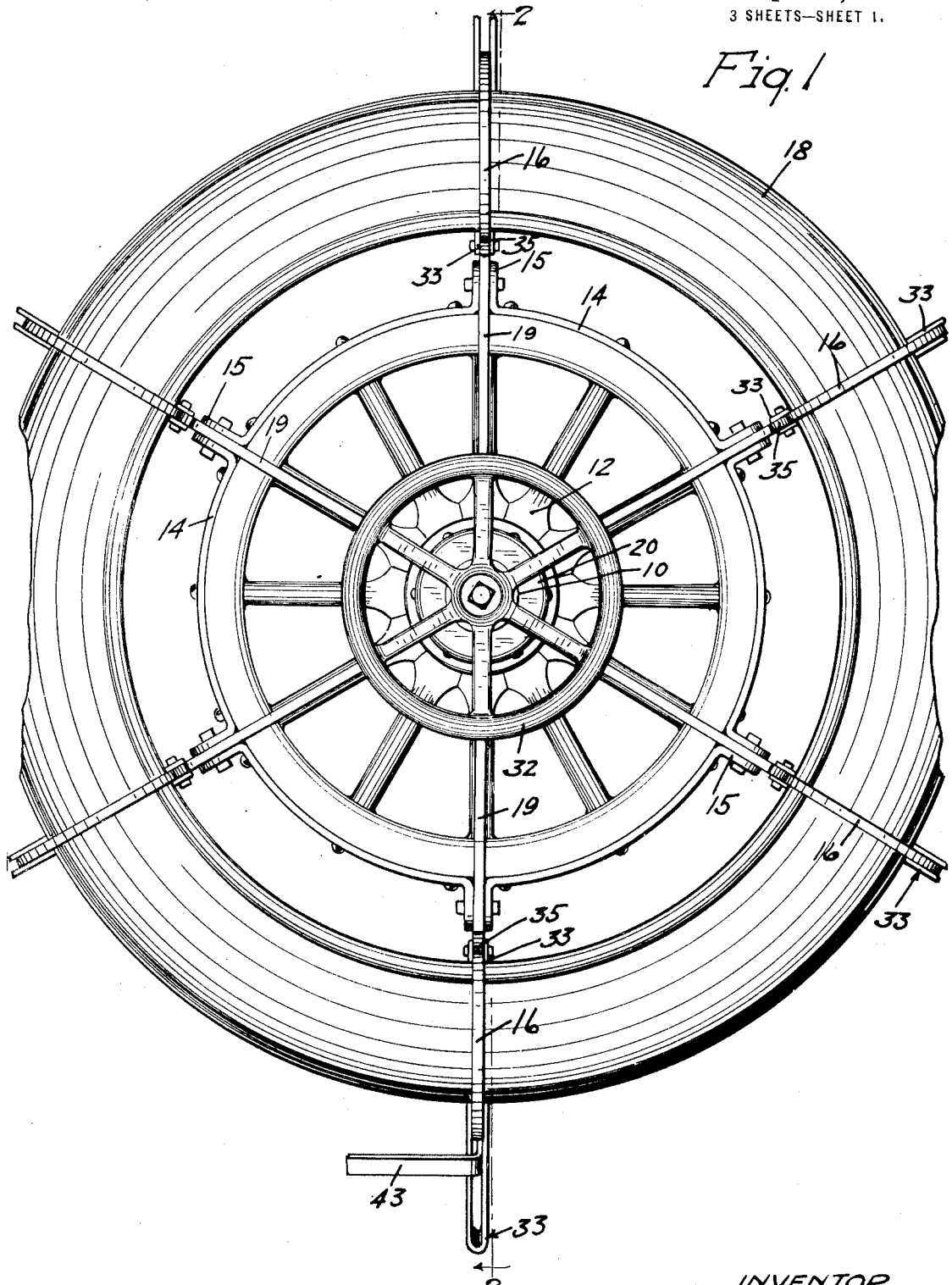

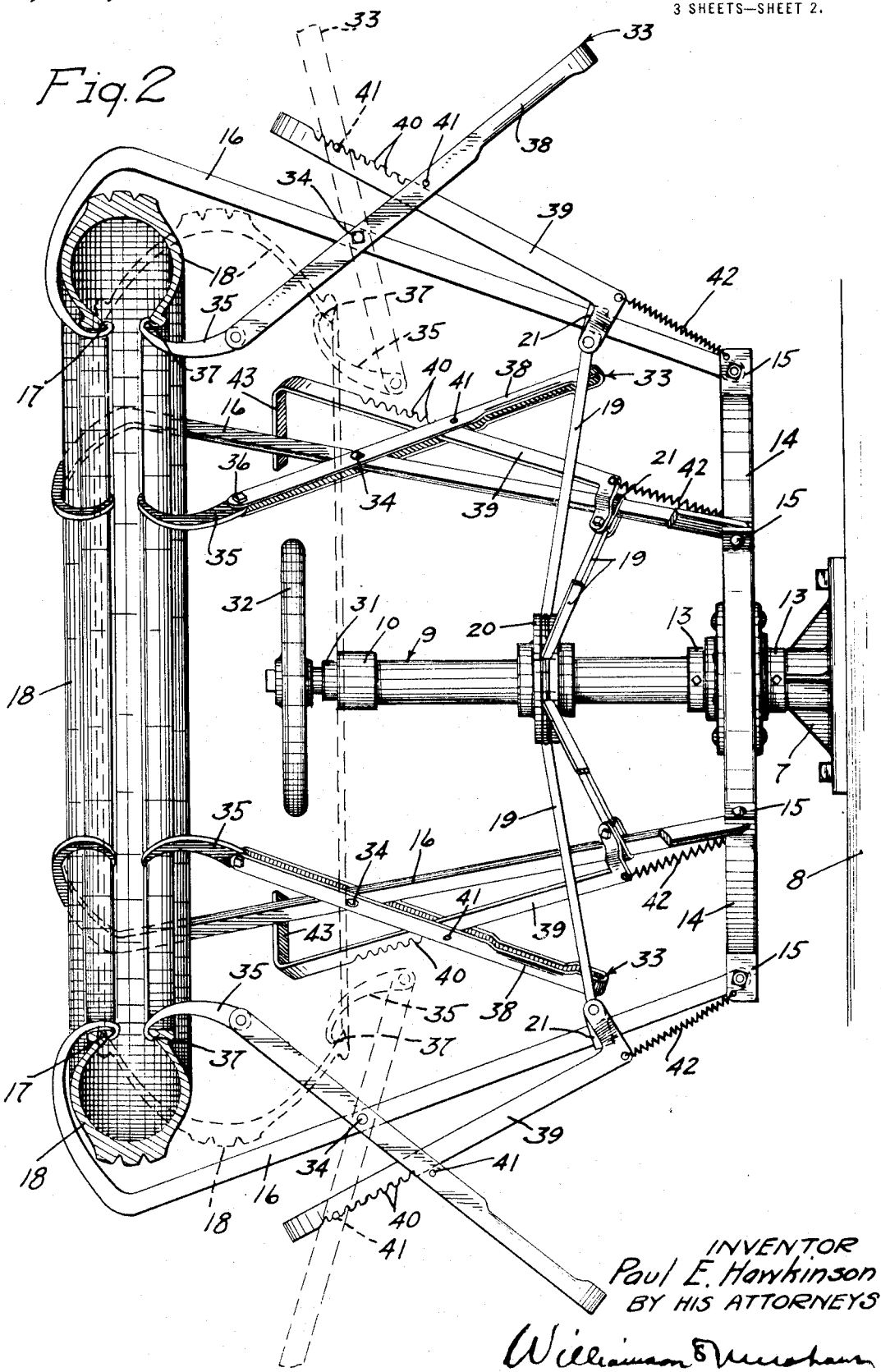

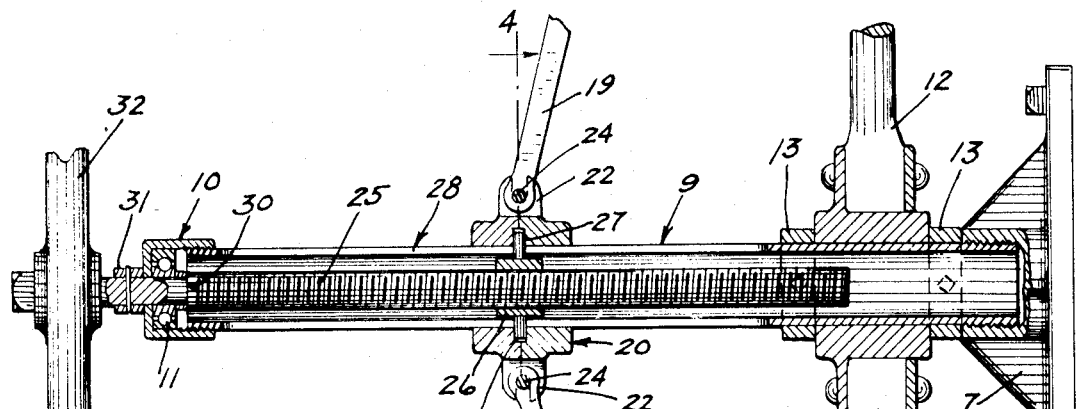

PAUL E. HAWKINSON, OF MINNEAPOLIS, MINNESOTA, ASSIGNOR, BY MESNE ASSIGNMENTS, TO KEHAWKE MFG. CO., OF MINNEAPOLIS, MINNESOTA, A CORPORATION OF MINNESOTA.

TIRE-CASING HOLDER AND SPREADER.

1,352,601.  Specification of Letters Patent.  Patented Sept. 14, 1920.

Application filed May 7, 1919. Serial No. 295,425.

*To all whom it may concern:*

Be it known that I, PAUL E. HAWKINSON, a citizen of the United States, residing at Minneapolis, in the county of Hennepin and State of Minnesota, have invented certain new and useful Improvements in Tire-Casing Holders and Spreaders; and I do hereby declare the following to be a full, clear, and exact description of the invention, such as will enable others skilled in the art to which it appertains to make and use the same.

My invention has for its object to provide a highly efficient support and spreader for pneumatic tire casings, to facilitate the work of inspecting, repairing or rebuilding the same.

To the above end, the invention consists of the novel devices and combinations of devices hereinafter described and defined in the drawings.

Heretofore, it has been the custom, in placing a reliner in a tire casing or otherwise repairing the same, to place blocks of wood or single spreaders between the edges of the tire casing to separate the same. This method is very slow and laborious, particularly when a tire casing is very heavy and stiff, and often an assistant is necessary to help spread and hold a tire casing. These spacing blocks or spreaders also have to be shifted often, as they are continually in the way of a workman and the material he is using. Furthermore, it is impossible to spread a tire sufficiently with blocks to fully open the same, so that it may be easily inspected and worked upon. By the use of my improved apparatus, a tire casing may be spread, so that the interior thereof is fully exposed and unobstructed throughout its full circumference. The apparatus also supports a tire casing, so that it may be revolved around a horizontal or fixed axis, thus permitting a workman to turn the casing to keep his work constantly in front of him.

The improved apparatus is also adapted to support a tire casing in the same manner that it is supported on its rim, so that the tread thereof is unobstructed thereby facilitating the inspection or work thereupon.

In the accompanying drawings, which illustrate the invention, like characters indicate like parts throughout the several views.

Referring to the drawings:

Figure 1 is a fragmentary front elevation of the improved apparatus and a tire casing supported thereon in position to be spread thereby;

Fig. 2 is a view partly in side elevation and partly in vertical section, taken on the line 2—2 of Fig. 1, with some parts shown in different positions by means of broken lines;

Fig. 3 is a fragmentary detail view principally in vertical section, taken centrally through the spindle of the apparatus, on an enlarged scale;

Fig. 4 is a fragmentary detail view in section taken on the line 4—4 of Fig. 3;

Fg. 5 is an enlarged view partly in section and partly in diagram of the tire casing held spread, and in which is placed a reliner; and Fig. 6 is a fragmentary view partly in section and partly in elevation showing the improved apparatus adjusted to support the tire casing thereon so that the tread thereof is unobstructed.

The numeral 7 indicates a supporting bracket rigidly secured by lag screws or other suitable means, to a wall, post or other support 8. A horizontal tubular spindle 9 has it rear end rigidly secured to the bracket 7, and on its front end is a cap 10 carrying a ball-bearing 11. The hub of a large head 12, in the form of a wheel having spokes which carry the felly thereof, is journaled on the spindle 9, close to the bracket 7, and held against axial movement thereon by a pair of set screw-equipped collars 13. On the periphery of the head 12 is a felly-band 14 comprising a plurality of segments, as shown, five, the ends of which are bent radially outward to afford pairs of circumferentially spaced lugs 15.

A plurality of circumferentially spaced primary grapple levers 16 have their rear ends pivoted to and between the lugs 15 for radial opening and closing movements, in respect to the spindle 9. The front end portions of the primary grapple levers 16 are curved inward upon themselves, each thereof terminating in a forwardly projecting sharp barb 17. These curved ends of the primary grapple levers 16 are of such size as to embrace a tire casing 18, and extend between the beaded edges thereof, irrespective of the diameter of its radial cross section. These barbs 17 are arranged to enter the bead on the side of the tire casing 18, adjacent to the curved end portions of the primary grapple levers 16, and engage the same from the inside of the tire casing, as best shown in Fig. 5.

The primary grapple levers 16 are simultaneously opened and closed by radial arms 19, carried by a small secondary head 20, mounted on the spindle 9 for compound axial and rotary movements. The outer ends of the arms 19 are pivoted to lugs 21 on the primary grapple levers 16, relatively close to their pivoted ends. The inner ends of the arms 19 extend into circumferentially spaced notches 22 formed in the head 20, which, as shown, is circumferentially divided and the sections thereof, rigidly connected by rivets or suitable fastening means. In the periphery of the head 20 is an annular channel 23 in which is laid a ring 24, which extends through bores in the inner ends of the arms 19 and pivotally connects the same to the head 20.

To impart axial movement to the head 20 and thereby open and close the primary grapple levers 16 through their arms 19, there is mounted in the ball-bearing 11 a feed screw 25 which extends axially into the spindle 9, and has mounted thereon, a traveling nut-block 26, having a diametrically opposite pair of radial pins 27, which extend through upper and lower longitudinal slots 28 formed in said spindle and project into an internal annular channel 29 formed in the two members of the head 20. Obviously, the pins 27 connect the head 20 to the nut-block 26 for common axial movement therewith, but with freedom for rotary movement in respect thereto.

The feed screw 25 is held against axial movement by forming thereon, a shoulder 30, arranged to engage the rear end of the ball-bearing 11, and a collar 31 keyed thereto, and arranged to engage the front face of the cap 10. On the front end of the feed screw 25 is a hand wheel 32, by which said screw may be turned to impart an axial traveling movement to the nut-block 26 thereon.

For coöperation with each primary grapple lever 16, is a secondary grapple lever 33, which comprises a pair of laterally spaced members connected at their outer ends. These members of the secondary grapple levers 33 embrace the respective primary grapple levers 16, and are intermediately pivoted thereto at 34. Each secondary grapple lever 33 includes a hook 35 inserted between the members thereof, at their inner ends, and pivoted thereto at 36. On the free end of each hook 35 is a barb 37 of the same size as the barb 17, and arranged to engage the other bead of the tire casing 18, from the inside and close to the edge thereof, as best shown in Fig. 5. The outer end portions of the secondary grapple levers 33 are shaped to afford handles 38.

An operator, when standing in front of the apparatus, may successively take hold of the handles 38 and by drawing the same forward, impart a movement to the inner end of the respective secondary grapple lever 33, which is away from the barb-equipped end of the respective primary grapple levers 16. This movement of the secondary grapple lever 33 spreads or opens the section of the tire casing 18, which is held by the respective barbs 17 and 37, as best shown by broken lines in Fig. 2.

To independently secure the secondary grapple levers 33 in different positions and hold the tire casing spread, there is pivoted to each lug 21 a latch bar 39, which projects forwardly between the members of the secondary grapple levers 33. On the outer edge of each latch bar 39, at its free end portion, is a plurality of ratchet teeth 40, any one of which is arranged to interlock with a transverse pin 41, secured to the members of the respective secondary grapple levers 33. To yieldingly hold the latch bars 39 with their ratchet teeth 40 interlocked with the pins 41, coiled springs 42 are anchored to certain of the lugs 15 on the head 12, and to off-set points on the pivoted ends of said latch bars. The free ends of the latch bars 39 are bent laterally to afford combined hand pieces and positioning stops 43 for a purpose that will presently appear.

To spread the tire casing 18 and thereby afford access to the interior thereof, throughout its entire circumference, the hand wheel 32 may be turned to open the primary grapple levers 16 sufficiently, to permit a tire casing to be moved axially therebetween. At this time, the secondary grapple levers 33 are preferably in substantially radial positions in respect to the spindle 9. When the tire casing is within the primary grapple levers 16, the same may be supported, at least in part, on the lowermost of said levers, and the wheel 32 is operated to close the primary grapple levers 16 sufficiently to cause their curved ends to embrace the tire casing 18. During this closing movement of the primary grapple levers 16 onto the tire casing, said casing may be moved toward the operator and positioned so that the barbs 17 extend between the beads thereof. The bead of the tire casing 18, next to the operator, is then forced onto the barbs 17.

With the tire casing 18 thus supported in part by the primary grapple levers 16, the operator may, with one hand, grasp the handle 38 of one of the secondary grapple levers 33, and with the other hand grasp the handle 43 of the respective latch bar 39. With the handles 38 and 43 thus held, an inward movement of the handle 43 will release the latch bar 39 from the secondary grapple levers 33 and a rearward movement on the handle 38 will carry the lock pin 41 rearward of all of the ratchet teeth 40. The respective hook 35 may then be lifted to carry its barb 37 between the bead of the tire casing 18 and said barb forced into the bead farthest from the operator, and from the inside of said casing. With said barb 37 thus held, a forward pull on the handle 38 will cause the lock pin 41 to slide over the ratchet teeth 40, and automatically lock any one thereof, when the forward movement of the handle 38 is stopped. This forward movement of the handle 38 will, of course, impart a rearward movement to the hook 35 and spread the tire casing 18, as shown by broken lines in Fig. 2. The secondary grapple levers 33 may thus be successively operated to spread the tire casing throughout its entire circumference and each time one of said levers is operated the operator may turn the apparatus on the spindle 9, to always keep his work in a convenient position.

After all of the barbs 37 have been secured to the respective bead of the tire casing, and the tire casing partly spread, the operator, if necessary, may readjust the secondary grapple levers to spread the edges of the tire apart, any distance desired, throughout the entire circumference of the casing. With the tire casing thus spread, the entire inner surface thereof is fully exposed and may be easily worked upon or inspected by rotating the apparatus on the spindle 9. A reliner 44, as shown, may be very easily placed in the tire casing when spread by the apparatus, for the reason that the operator can always work on the lowermost section of the tire casing, which is directly in front of him.

An entire reliner, or part thereof, may be placed and secured in the tire casing, while spread by the apparatus, except its longitudinal edges, as shown in Fig. 5, and these edges may be pressed onto the tire casing at the time each barb 17 or 37 is separated from the respective bead of the tire casing. The separation of the barbs 17 and 37 for the beads of the tire casing cannot take place until the secondary grapple levers 33 have been released and the tire casing returns to normal position.

To inspect or repair the outside of a tire casing, or to cement carcass and apply a tread, the wheel 32 is operated to close the primary grapple levers 16 sufficiently, to permit the tire casing 18 to be placed therearound, and supported on its beads, as shown in Fig. 5, in the same manner that a tire casing is supported on a wheel rim. In this use of the apparatus, the latch bars 39 are in positions to permit their handles 43 to act as stops in positioning the tire casing on the primary grapple levers 16, as shown in Fig. 6. After the tire casing has been placed on the primary grapple levers 16, the wheel 32 may be operated to move said levers radially outward and thereby carry the same into engagement with the beads of said casing and thereby securely support the same to be revolved around a horizontal action.

What I claim is:—

1. An apparatus of the class described comprising a base adapted to be secured to a wall or other vertical surface, a plurality of forwardly projecting arms provided at their extremities with hooks arranged to lie around and engage an edge of a tire casing, being the edge farther away from said base, a second set of hooks adapted to engage that edge of the tire casing nearer said base, means for moving one set of said hooks away from the other set, to spread open the tire casing and means for mounting said arms and hooks on said base for movement around a horizontal axis, and means at said axis arranged when operated to adjust the several hooks toward and away from said axis.

2. An apparatus of the class described, comprising a base adapted to be secured to a wall or other vertical surface, a plurality of hooks adapted to lie around and engage the edge of a tire casing disposed in a vertical plane in front of said base, a second set of hooks arranged to engage the other edge of the tire casing, being the edge of the casing nearer the base, means for moving the last-mentioned set of hooks away from the first set and toward said base and means for mounting said hooks and the appurtenant operating mechanism thereof on said base for movement around a horizontal axis, and means located at said axis and accessible through the tire casing arranged when operated to move the several hooks toward and away from said axis.

3. In an apparatus for the purpose set forth, the combination with a fixed spindle, of a revoluble head mounted on the spindle, a plurality of circumferentially spaced primary grapple levers carried by the head for radial adjustment, means for radially adjusting said levers, secondary grapple levers carried by the primary grapple levers for spreading adjustment in respect thereto, said primary and secondary grapple levers arranged to engage opposite edges of a tire casing, and means for holding the secondary grapple levers spread.

4. In an apparatus for the purpose set forth, the combination with a fixed spindle, of a revoluble head mounted on the spindle, a plurality of circumferentially spaced primary grapple levers carried by the head for radial adjustment, means for radially adjusting said levers, secondary grapple levers carried by the primary grapple levers for spreading adjustment in respect thereto, said primary and secondary grapple levers having barbs arranged to engage opposite edges of a tire casing, and means for holding the secondary grapple levers spread.

5. In an apparatus for the purpose set forth, the combination with a fixed spindle, of a revoluble head mounted on the spindle, a plurality of circumferentially spaced primary grapple levers carried by the head for radial adjustment, means for radially adjusting said levers, secondary grapple levers carried by the primary grapple levers for spreading adjustment in respect thereto, hooks pivoted to the secondary grapple levers, said primary grapple levers and hooks having barbs arranged to engage opposite edges of a tire casing, and means for holding the secondary grapple levers spread.

6. In an apparatus for the purpose set forth, the combination with a spindle, of a revoluble head mounted on the spindle, a plurality of circumferentially spaced primary grapple levers pivoted to the head for radial adjustment, a secondary head mounted on the spindle for compound axial and rotary movements, arms pivotally connecting the primary grapple levers to the secondary head, means for axially adjusting the secondary head on the spindle, secondary grapple levers pivoted to the primary grapple levers, said primary and secondary grapple levers arranged to engage opposite edges of a tire casing, and means for holding the secondary grapple levers spread.

7. In an apparatus for the purpose set forth, the combination with a spindle, of a revoluble head mounted on the spindle, a plurality of circumferentially spaced primary grapple levers pivoted to the head for radial adjustment, a secondary head mounted on the spindle for compound axial and rotary movements, arms pivotally connecting the primary grapple levers to the secondary head, means for axially adjusting the secondary head on the spindle, secondary grapple levers pivoted to the primary grapple levers, said primary and secondary grapple levers arranged to engage opposite edges of a tire casing, and latch bars carried by the primary grapple levers for holding the secondary grapple levers spread.

8. In an apparatus for the purpose set forth, the combination with a spindle, of a revoluble head mounted on the spindle, a plurality of circumferentially spaced primary grapple levers pivoted to the head for radial adjustment, a secondary head mounted on the spindle for compound axial and rotary movements, arms pivotally connecting the primary grapple levers to the secondary head, means for axially adjusting the secondary head on the spindle, secondary grapple levers pivoted to the primary grapple levers, said primary and secondary grapple levers arranged to engage opposite edges of a tire casing, and latch bars pivoted in respect to the primary grapple levers and provided with ratchet teeth arranged to engage detents on the secondary grapple levers for holding the same spread in different adjustments.

9. In an apparatus for the purpose set forth, the combination with a spindle, of a revoluble head mounted on the spindle, a plurality of circumferentially spaced primary grapple levers pivoted to the head for radial adjustment, a secondary head mounted on the spindle for compound axial and rotary movements, arms pivotally connecting the primary grapple levers to the secondary head, means for axially adjusting the secondary head on the spindle, secondary grapple levers pivoted to the primary grapple levers, said primary and secondary grapple levers arranged to engage opposite edges of a tire casing, latch bars pivoted in respect to the primary grapple levers and provided with ratchet teeth arranged to engage detents on the secondary grapple levers for holding the same spread in different adjustments, and springs yieldingly holding the latch bars with their ratchet teeth interlocked with the detents of the secondary grapple levers.

10. In an apparatus for the purpose set forth, the combination with a spindle of a revoluble head mounted on said spindle, a plurality of circumferentially spaced primary grapple levers carried by the head for radial adjustment, a secondary head mounted on the spindle for compound axial and rotary movements, arms pivotally connecting the primary grapple levers to the secondary head, a feed screw mounted in the spindle and having a nut-block held against rotary movement, but with freedom for axial traveling movement thereon, and means for connecting the nut-block to the secondary head for axial movement therewith, but with freedom for rotary movement in respect thereto.

11. In an apparatus for the purpose set forth, the combination with a spindle of a revoluble head mounted on said spindle, a plurality of circumferentially spaced primary grapple levers carried by the head for radial adjustment, a secondary head mounted on the spindle for compound axial and rotary movements, arms pivotally connecting the primary grapple levers to the secondary head, a feed screw mounted in the spindle and having a nut-block held against rotary movement, but with freedom for axial traveling movement thereon, means for connecting the nut-block to the secondary head for axial movement therewith, but with freedom for rotary movement in respect thereto, and means by which said feed screw may be rotated.

12. An apparatus of the class described, comprising a base adapted to be secured to a wall or other vertical support, a plurality of hooks adapted to engage an edge of a tire casing disposed in a vertical plane in front of said base, a second set of hooks arranged to engage the other edge of the said tire casing, being the edge of the casing next adjacent said base, means for mounting said hooks on said base for movement around a horizontal axis, together with devices arranged, when operated, radially to adjust all of said second set of hooks, and means for moving the second set of hooks away from the first set and toward said base to spread apart the casing to facilitate the inspection and repair thereof.

13. In a device for spreading tire casings to facilitate the inspection and repair thereof, means for suspending the tire casing in a vertical plane comprising two sets of hooks adapted to engage the edges of the casing, means arranged when operated to move one set of said hooks horizontally away from the other set of hooks to spread the casing wide open, together with a support whereon said hooks are rotatably mounted for movement around a horizontal axis whereby the casing, suspended as aforesaid, may be turned so that any portion of its inner surface will lie spread out beneath the eyes of a workman standing in front of said casing.

14. In a device for spreading tire casings to facilitate the inspection and repair thereof, a support adapted to be attached to a wall or the like, a cylindrical member projecting horizontally from said support, a spider journaled for rotary movement around said cylindrical member, two sets of hooks carried by said spider, said hooks arranged to engage the edges of a casing and hold the same suspended in a vertical plane with the center thereof in line with the axis of said cylindrical member, a hand wheel rotatably supported by said cylindrical member at the end thereof opposite said support, and operating connections between said hand wheel and hooks whereby said hooks may be adjusted toward and away from said cylindrical member by manipulating said hand wheel, together with means for moving one set of hooks away from the other set to spread the casing wide open for inspection and repair.

In testimony whereof I affix my signature in presence of two witnesses.

PAUL E. HAWKINSON.

Witnesses:
W. I. WARD,
HARRY D. KILGORE.